Figure 1:
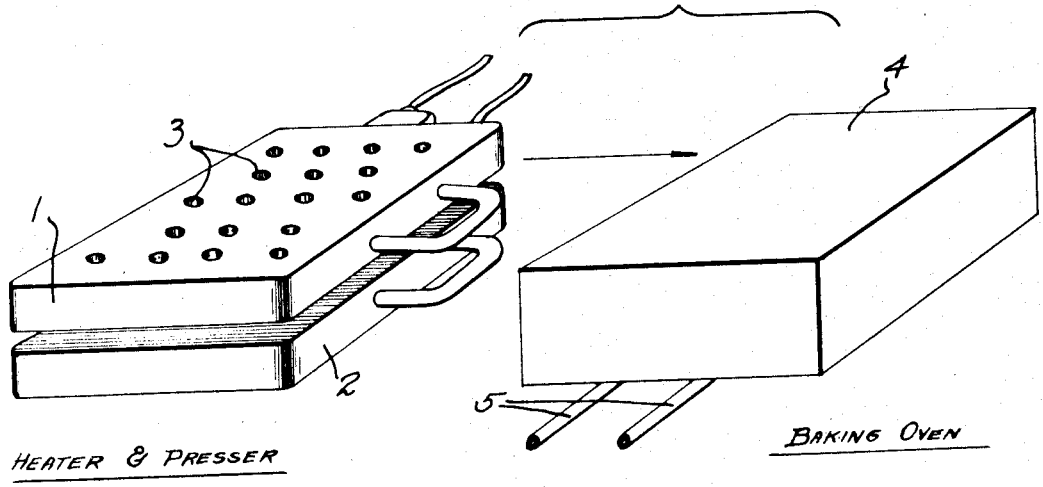

July 3, 1934.  R. McKEE  1,965,082
CRACKER AND METHOD OF MAKING THE SAME

Filed Feb. 29, 1932

Inventor
Raymond McKee
By Lyon & Lyon
Attorneys

Patented July 3, 1934

1,965,082

UNITED STATES PATENT OFFICE 1,965,082

CRACKER AND METHOD OF MAKING THE SAME

Raymond McKee, Brentwood Heights, Calif.

Application February 29, 1932, Serial No. 595,869

6 Claims. (Cl. 99—10)

This invention relates to crackers and to the method of preparing the same and is primarily directed to a cracker and method of producing the same from such products as stale bread or other similar baked pastry products.

Enormous quantities of what is known as "stale" bread is returned daily to the bakers of bread throughout the United States. This bread is bread which has been delivered for sale during the preceding day principally in order that the retailer of the bread may at all times have on display a quantity of bread for sale. This bread, after it is returned, has practically no market value and represents enormous loss to the bakers.

It is an object of my invention to provide a method of distribution of this waste product of bakeries and to utilize this waste or stale bread by the preparation of crackers which will find a ready market due to their preparation, flavoring, and the like.

Another object of this invention is to provide as an article of manufacture a cracker formed of a previously baked raised bread product, the interstices of which are eliminated by heat and pressure to form a crisp wafer or cracker.

Another object of this invention is to provide a method of making the cracker of a waste raised bread product which includes the subjecting of a portion or slice of such bread to the action of heat and pressure so that the slice of bread is compressed to a thin, crisp wafer.

I have discovered that enormous quantities of what is now considered waste bread may be utilized for the purpose of producing a cracker having very pleasing characteristics by slicing this bread, cutting the bread into the forms or shapes desired, and then subjecting the portions of the bread so formed to the action of heat and pressure so that a crisp, thin wafer is formed which is further cooked during the operation of eliminating the interstices thereof, and which may then be baked to increase the crispness thereof if desired.

In carrying out my invention in the preferred form, the loaves of stale bread are first sliced and the slices of bread are then cut preferably to eliminate the crusts of the bread to the shape or form desired for the subsequently formed cracker. The portions of the bread thus formed which are raised so as to include the multiplicity of air pockets or interstices are then subjected to the simultaneous action of heat and pressure to eliminate the interstices or air pockets and compress the product so that it is nearly a solid mass or wafer from which the voids produced in the bread during its previous raising have been eliminated, and during which process the portions of the bread surrounding the voids or interstices are rendered more or less plastic under the influence of heat and pressure so that they adhere together to form a thin wafer which remains as a thin wafer after it has been removed from the influence of the heat and pressure.

In the drawing I have illustrated diagrammatically an apparatus which may be utilized for carrying out the method of producing the crackers embodying my invention.

Figure 2:
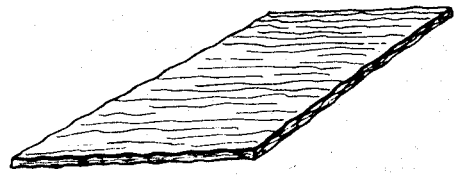

Figure 2 is a perspective view of a thin wafer or cracker produced in accordance with my invention.

In carrying out the process embodying my invention, the bread is first sliced and cut into the form or shape desired. It is then placed between a pair of hot plates 1 and 2 which are heated in any suitable or desirable manner such, for example, as by means of electrical resistance heating elements. The slices of raised bread are placed between the heated plates 1 and 2 and are there subjected to a temperature of approximately 250 to 400° F. The pressure may be imposed upon the bread between the plates 1 and 2 in any suitable or desirable manner such, for example, as by pressing downwardly upon the upper heated plate 1. During the heating and pressing of the portions of bread, the steam formed under the influence of heat must be permitted to escape, and for this purpose I prefer to alternately raise and lower the upper plate 1 through relatively short intervals of time sufficient to permit the steam which has accumulated to escape. This same object can be accomplished, however, by perforating the upper plate 1 with perforations such, for example, as illustrated at 3 without the necessity of relieving the pressure from the bread between the plates 1 and 2.

In carrying out the preferred method of forming the crackers embodying my invention, I prefer to remove the wafer from between the plates 1 and 2 before it has been completely cooked or processed, and to place the same into an oven 4 which is heated in any suitable or desirable manner such, for example, as by means of gas burners 5 in which oven the crackers are preferably completely dried and browned at a temperature preferably between 300 and 600° F.

As illustrated in Figure 2, the cracker produced is a thin wafer, the voids of which are substantially eliminated under the influence of heat and pressure and during which process the bread surrounding these voids has been caused to adhere together and is further cooked to produce a crisp wafer.

Having fully described my invention, it is to be understood that I do not wish to be limited to the details herein set forth, but my invention is of the full scope of the appended claims.

I claim:

1. A method of making a cracker, including the step of slicing a portion of bread from a previously baked loaf, and subjecting the slice to the action of heat and pressure to form a thin wafer.

2. A method of making a cracker, comprising the steps of slicing bread from a previously baked stale loaf, subjecting the slice to heat and pressure between adjacent surfaces to form a thin wafer, and thereafter baking the wafer.

3. A method of making a cracker including the steps of subjecting a slice of previously baked bread to the action of heat and pressure to compress the bread to eliminate the voids therein and to cause the bread surrounding the voids to adhere together and then baking the compressed bread to produce a crisp wafer.

4. The method of forming an edible biscuit of wafer-like thinness, which comprises compressing the crumb portion of an integral slice of baked bread between heated wafer forming elements with sufficient pressure applied directly to opposite sides of the bread slice to uniformly compact the crumb material of the slice and produce a flat, hard and crisp toasted bread wafer having a plate-like surface texture.

5. As a new article of manufacture, a flat, hard and crisp toasted edible biscuit of wafer-like thinness formed from a substantially uniformly compacted integral slice of bread crumb, said biscuit having a plate-like surface texture.

6. As a new article of manufacture, a flat, hard, crisp and toasted edible biscuit of wafer-like thinness formed from an integral slice of bread crumb substantially uniformly compressed transversely of the slice, the biscuit having a plate-like surface texture.

RAYMOND McKEE.